United States Patent Office 3,804,864
Patented Apr. 16, 1974

3,804,864
NOVEL PROCESS FOR OXIDATION OF SUBSTITUTED PHENOLS USING COMBINATIONS OF TWO METAL SALTS
Thomas F. Rutledge, Wilmington, Del., assignor to ICI America Inc., Wilmington, Del.
No Drawing. Continuation-in-part of abandoned application Ser. No. 879,539, Nov. 24, 1969. This application Dec. 29, 1971, Ser. No. 213,735
Int. Cl. C07c 43/22, 49/64, 49/82, 65/14
U.S. Cl. 260—396 R
6 Claims

ABSTRACT OF THE DISCLOSURE

An improved process for the oxidation of 2,6-dialkylphenols which comprises the mixing of the dialkylphenol in the presence of an oxygen containing gas and a catalyst selected from a combination of a noble metal salt and cupric or ferric nitrate in a particular solvent and heating the mixture to yield 2,6-dialkylquinone, diphenoquinone, and an oxidized polyphenoxyether. The noble metal salts which were found to be effective are palladium chloride, palladium acetate, ruthenium chloride, rhodium chloride, and the solvents which were found to be effective are: tertiary hexyl alcohol, tertiary amyl alcohol and methyl isobutyl ketone.

This application is a continuation-in-part of U.S. patent application Ser. No. 879,539, filed Nov. 24, 1069, now abandoned.

This invention concerns an improved process for the oxidation of dialkyl phenols to quinones and polyphenoxyethers. More particularly, this invention relates to the oxidation of 2,6-alkyl substituted phenols to 2,6-dialkylquinone, diphenoquinone, and a polyphenoxyether wherein the side chains have been oxidized.

It is an object of this invention to provide a process for the oxidation of 2,6-substituted phenols to a variety of quinones and polymers of the phenoxy variety.

It is another object of this invention to provide novel polyphenoxy compounds.

It is another object of this invention to provide a method for the direct oxidation of 2,6-dialkylphenols to the corresponding 2,6-dialkylquinones and diphenoquinones.

Other objects of this invention will become evident to those skilled in the art from the following detailed description of the invention.

In general, this process include the oxidation of a 2,6-substituted alkyl phenol by an oxygen containing gas in the presenec of a catalyst and solvent. The reaction is liquid-phase and solvent specific since only tertiary hexyl alcohol, t-amyl alcohol and methyl isobutyl ketone have been found to be effective solvents. The catalysts which have been found effective are in general noble metal salts in conjunction with cupric or ferric nitrate. The particular noble metal catalysts which are used in conjunction with the cupric and ferric nitrates are palladium chloride, palladium acetate, ruthenium chloride and rhodium chloride.

The process consists of heating the phenol, catalyst and solvent system to a moderate temperature for an induction period usually running from 1 to 3 hours or heating the catalyst-solvent system and then adding the dialkylphenol after up to 3 hours, at which time the reaction starts and proceeds rapidly, and is completed in another hour or two. In general the temperature range at which this process is operative is from about 20° C. to about 80° C. with a preferred range of 30° C. ot 70° C. After the reaction has gone to completion the products of the reaction, namely, 2,6-dialkylquinone, the corresponding diphenoquinone and polyphenoxyether, are separated by the following procedure: the solution of 2,6-dialkylquinone and polyphenoxyether is separated from the diphenoquinone and the catalyst by filtration and then a wash of the filter cake with an alcohol, such as methanol. The catalyst and the diphenoquinone are then separated by dissolving the diphenoquinone in a solvent such as methylene chloride. The mixture of the 2,6-dialkylquinone and the polyphenoxyether are dried to a solid state, upon further heating the residual solvent is flashed and the 2,6-dialkylquinone vaporizes (sublimes) leaving behind the polyphenoxyethers. The 2,6-dialkylquinone is then collected in a reflux condenser or other similar cold trap and the polyphenoxyether may be dissolved in any of a number of solvents, such as methanol, t-butyl alcohol and including all of those solvents used in the initial process.

The 2,6-dialkylphenol used in carrying out this oxidation reaction can be any alkyl phenol, and the alkyl groups of the 2,6-position need not be symmetrical. Examples of the phenols used in carrying out this process are 2,6-xylenol, 2-methyl-6-butylphenol, 2,6-diisobutylphenol, 2-octyl-6-methylphenol, 2-isobutyl-6-dodecylphenol, 2-ethyl-6-methylphenol, 2,6-didecylphenol, 2,6-ditertiary-amylphenol and 2,6-ditertiarybutylphenol. It has been found where the two or the six position is substituted with a nonalkyl moiety that the reaction will not readily proceed. Thus, a phenol such as 2-methyl-6-chlorophenol or 2-methyl-6-aminophenol will not readily undergo the oxidation reaction of the instant specification. It has also been determined that the various alkyl side chains of the dialkylphenol cause a variation in reaction products. Thus the longer the alkyl chain the smaller the number of alkyl chains oxidized in the polyphenoxy ether. Also branched side chains such as tertiary amyl radical do not undergo oxidation at all. Furthermore, the oxidation is most likely to occur at the α-carbon atom of the alkyl radical.

In a preferred embodiment of this invention the catalyst system is a combination of cupric nitrate and palladium chloride in a molar ratio of about 3/1 through about 16/1 respectively. The solvent in this preferred embodiment would be tertiary amyl alcohol containing from 0.2 to 2.0 mol percent 3-methyl-2-butanol and from 0.3 to 4.0 mol percent 3-methyl-2-butanone. Dialkylphenols used in this preferred embodiment would be those phenols whose alkyl groups contain from 1 to about 5 carbon atoms. The concentration of the noble metal salt in mols per mol of reaction is usually from about 0.03 to 0.0033 with the amount of nitrate used being determined by the above ratios.

The products of this reaction can be characterized by the following three formulae:

(a) 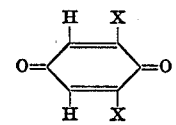

(b) 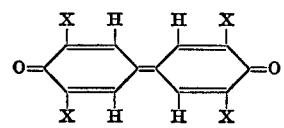

(c) 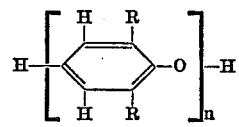

wherein X, in Formulas (a) and (b), is an alkyl radical containing from 1 to 16 carbon atoms. A preferred group of said alkyl radicals contain from 1 to 5 carbon atoms. In Formula (c) above R is independently selected from the group consisting of an alkyl radical, an α-hydroxy alkyl radical, a carboxy alkyl radical, an α-alkanoyl radical, and a radical represented by the formula

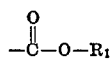

wherein $R_1$ is a hydrogen, alkyl, or 2,6-dialkyl phenyl radical. $n$ in Formula (c) is an integer from about 2 to about 30. Examples of the alkyl radicals which are within R of Formula (c) include methyl, propyl, heptyl, decyl, dodecyl, and octadecyl alkyl radicals. Among those radicals which are within the α-hydroxy alkyl radical are radicals containing from 1 to 16 carbon atoms such as hydroxymethyl, α-hydroxyheptyl, α-hydroxydodecyl, and α-hydroxyhexadecyl. Among the radicals within said carboxyalkyl class of radicals are: carboxymethyl, and carboxyethyl radicals, and examples of the alkanoyl radicals include acetyl, propionyl and octanoyl. In the polyphenoxy ethers within Formula (c) at least 25% and preferably at least 40% of the side chains are oxidized and contain carboxy, hydroxy or carbonyl groups.

In a preferred group of polyphenoxy compounds within Formula (c) above are those compounds wherein the alkyl radicals contain from 1 to 5 carbon atoms, $n$ is a number from 3 to about 10, and the α-hydroxyalkyl, alkanoyl and carboxyalkyl radicals contain from 1 to 5 carbon atoms.

The compounds made by this process have many uses. For instance, the xyloquinone represented by Formula (a) above upon hydrogenation forms a valuable anti-fertility drug for humans and has been used extensively in countries such as India to decrease the rate of births in the population. The diphenoquinone as represented by Formula (b) above upon hydrogenation forms a valuable intermediate for polyester compounds. The 2,6-dimethyl hydroquinone itself is a well known monomer for polyesters. The oxidized polyphenoxyether, represented by Formula (c) above, may be used as a monomer in preparing polyester products or further condensed with alkyl phenols to give a high polymer resin containing polyether linkages. The polyesters may be prepared by reacting hydroxyl groups present in the polyphenoxyether with a polycarboxylic acid, such as fumaric acid or phthalic acid, or by reacting carboxy groups present in the polyphenoxyether with a polyol, such as an ethylene glycol or glycol ether of bisphenol A. The polyphenoxyether may also be reacted with a mixture of a polycarboxylic acid and polyol. The polyesters prepared from the polyphenoxyethers can be molded into thermoset shapes or used in preparing laminated products.

Three preferred procedures were used in the following examples to produce the products by the subject reaction. These procedures are:

PROCEDURE 1

The dialkyl phenol, solvent and catalyst are placed in a reaction vessel at atmospheric pressure and heated to a temperature between 20 and 80° C. Oxygen containing gas is contacted with the reaction mixture. After an induction period, during which time the reactants come to temperature and the reaction is initiated, reaction will be observed as indicated by a sudden change of the solution color to red; the reaction is then allowed to proceed to completion. Completion in all cases is when oxygen is no longer taken up.

PROCEDURE 2

The solvent-catalyst combination is heated to reaction temperature. During this period of heating the catalyst-solvent system is contacted with oxygen. After approximately one-quarter of an hour to an hour a small amount of the phenol is injected into the heated oxygenated catalyst-solvent system; and after a few minutes a reaction starts, as evidenced by oxygen uptake and a change of the solution to a red color. The remaining amount of the phenol is then added either at once or incrementally.

PROCEDURE 3

The solvent, the catalyst and a small amount of the phenol are heated under an oxygen atmosphere for about $\frac{1}{25}$ to $\frac{1}{3}$ of an hour. The reaction starts as indicated by a change in color to red and by oxygen consumption. The remaining phenol is then added either incrementally or at once.

The distinguishing features of the above three methods are that methods two and three avoid the extreme exotherm which occurs in method 1. This exotherm is caused by the rapid reaction of the phenol once the induction period is over. It is easy to see from methods 2 and 3 that either a continuous process or a batch process is feasible in this process.

EXAMPLE 1

Per Procedure 1, 15 millimols of 2,6-xylenol are dissolved in 11 milliliters of tertiary amyl alcohol. To this is added 0.5 millimol of palladium chloride and 2 millimols of cupric nitrate trihydrate. The mixture is heated to 55° C. and is contacted with oxygen for an induction period lasting 25 minutes. The reaction is then continued for 1.5 hours with 11.8 millimols of oxygen being consumed. The yield is quantitative and the products of the reaction based upon mols of the phenol converted in mol percent are 31.7% xyloquinone, 28% diphenoquinone and 45% polyphenoxy ether compound.

EXAMPLE 2

Per Procedure 1, 15 millimols of 2,6-xylenol are dissolved in 10 milliliters of tertiary amyl alcohol and mixed with 0.25 millimol of palladium chloride and 2.0 millimols of cupric nitrate trihydrate. This mixture is heated to 55° C. and oxygen is bubbled through for an induction period of one hour. The reaction then proceeds for an additional hour consuming 7.15 millimols of oxygen. The yield is quantitative and the mol percent conversion to the products is 49% xyloquinone, 25% diphenoquinone and 25% polyphenoxy ether.

EXAMPLE 3

Per Procedure 2, 10 milliliters of tertiary butyl alcohol and 0.25 milliliter of 3-methyl-2-butanol mixed with 0.25 millimol of rhodium chloride and 2 millimols of cupric nitrate are heated at 55° C. for $\frac{1}{3}$ of an hour. To this solvent catalyst mixture is added 15 millimols of 2,6-xylenol. The reaction, which commences at once, is allowed to proceed for 4½ hours and 2.24 millimols of oxygen are consumed. There is 44 mol percent xylenol, 6 mol percent diphenoquinone, 50 mol percent polyphenoxy ether in the product based upon conversion of the phenol.

EXAMPLE 4

10 milliliters of tertiary amyl alcohol and 0.25 milliliter of 3-methyl-2-butanol are mixed with 0.25 millimol of palladium acetate and 2 millimols of cupric nitrate and heated in the presence of 3 millimols of 2,6-xylenol and oxygen for an induction period of three minutes at 55° C. The reaction commences and is allowed to proceed for two and one-quarter hours with the addition of 12 more millimols of 2,6-xylenol and a total consumption of 3.35 millimols of oxygen. The product consists of 47 mol percent alkyl substituted diphenoquinone, 46.5 mol percent unreacted xylenol, and a trace of xyloquinone, based upon conversion of the xylenol.

EXAMPLE 5

Per Procedure 2, 10 milliliters of tertiary amyl alcohol, 0.25 milliliter of 3-methyl-2-butanol, 0.0625 millimol of palladium chloride, and 2 millimols of cupric nitrate are heated to 55° C. for an induction period of 1¼ hours. To this heated catalyst solvent system is added 15 millimols of 2,6-xylenol and oxygen is contacted through the mixture. The reaction proceeds for ½ hour with a total consumption of 9.35 millimols of oxygen. The xylenol is converted quantitatively to the following mol percents: 18.4 xyloquinone, 31 diphenoquinone, and 50.6 polyphenoxy ether.

EXAMPLE 6

Per Procedure 2, 10 milliliters of tertiary amyl alcohol, 0.125 milliliter of 2-methyl-2-butanol, 0.25 millimol of palladium chloride and 2 millimols of ferric nitrate are heated to 55° C. for an induction period of ¼ hour. To this solvent catalyst system is added 15 millimols of 2,6-xylenol and oxygen is contacted with the system. The reaction commences and proceeds for 3 hours with the consumption of 8.2 millimols of oxygen. A quantitative yield is obtained and the product is divided in the following mol percent conversion: 20% xyloquinone, 22% diphenoquinone and 58% polyphenoxy ether.

EXAMPLE 7

Per Procedure 2, 10 milliliters of tertiary hexyl alcohol, 0.25 millimol of palladium chloride and 2.0 millimols of cupric nitrate are heated for an induction period of a quarter hour at 55° C. To this is added 15 millimols of 2,6-xylenol and an oxygen containing gas is contacted. The reaction commences and is allowed to proceed for ½ hour during which time 8.66 millimols of oxygen are consumed. The product yield is quantitative and mol percent conversion is as follows: 20.5% xyloquinone, 35% diphenoquinone, and 43.5% of polyphenoxy ether.

EXAMPLE 8

Per Procedure 3, 0.25 millimol of palladium chloride and 2 millimols of cupric nitrate are added to 10 milliliters of methyl isobutyl ketone and 3 millimols of 2,6-xylenol; the mixture is heated to 65° C. under oxygen for an induction period of ¾ of an hour. At this point the reaction commences and proceeds for an additional 2½ hours; the total consumption of oxygen is 7.15 millimols. The yield is quantitative and the following mol percent product distribution was present: 3.5% xyloquinone, 69.5% diphenoquinone and 27% polyphenoxy ether.

EXAMPLE 9

Per Procedure 2, 10 millimeters of methyl isobutyl ketone, 0.25 millimol of palladium chloride and 2.0 millimols of cupric nitrate are heated for 25 minutes at 40° C. under oxygen. After this induction period 15 millimols of 2,6-xylenol are added and the oxygen feed is continued. The mixture is maintained at the above temperature for an additional 2⅓ hours. At the end of the reaction 7.8 millimols of oxygen have been consumed and the product distribution in mol percent conversion is as follows: 11.7% xyloquinone, 4.1% unreacted xylenol, 56% diphenoquinone, and 28% polyphenoxy ether.

EXAMPLE 10

One hundred milliliters of methyl isobutyl ketone, 1.25 millimols of palladium chloride and 20 millimols of cupric nitrate are heated to 45° C. in the presence of oxygen. At this point 30 millimols of 2,6-xylenol are added and oxygen is bubbled through the stirred reactor. Four more portions of 30 millimols each of 2,6-xylenol are added over a 1¼ hour period. The reaction proceeds for a total of 4¾ hours at the end of which 76.5 millimols of oxygen has been consumed. The product distribution in mol percent is as follows: 6.9 xyloquinone, 58.4 diphenoquinone and 35% polyphenoxy ether.

EXAMPLE 11

Per Example 10, 100 milliliters of methyl isobutyl ketone, 0.625 millimol of palladium chloride, and 20 millimols of cupric nitrate are heated to a temperature of 45° C. Over a period of 1¼ hours 150 millimols of 2,6-xylenol are added in 30 millimol quantities. The reaction is allowed to proceed for a total of five hours during which time 80 millimols of oxygen are consumed. The following product distribution in mol percent conversion is obtained: 7.8 xyloquinone, 2.6 unreacted xylenol, 55 diphenoquinone and 35 polyphenoxy ether.

EXAMPLE 12

Per Procedure 3, 20 milliliters of tertiary hexyl alcohol are heated with 0.5 millimol of palladium chloride and 3 millimols of cupric nitrate to 60° C. Oxygen is bubbled through and 3 millimols of 2-methyl-6-ethyl xylenol are added over an induction period of 30 minutes. The reaction commences and an additional 20 millimols of 2-methyl-6-ethyl xylenol are added and the reaction continued for a total of 3 hours. During this time oxygen has been continuously added. The product includes unreacted phenol, the diphenoquinone, and polyphenoxy ether products.

EXAMPLE 13

Per Procedure 2, 10 milliliters of tertiary hexyl alcohol, 0.25 millimol of palladium chloride and 0.125 millimol of cupric nitrate are heated to 55° C. for an induction period of 25 minutes. To this is added 2,6-dipropyl phenol. The reaction is commenced and continued for 2½ hours. The product includes unreacted phenol, the diphenoquinone and polyphenoxy ether.

EXAMPLE 14

Per Procedure 1, 15 millimols of 2,6-xylenol, 10 milliliters of tertiary amyl alcohol, 0.25 millimol of ruthenium chloride, and 2.0 millimols of cupric nitrate in the presence of oxygen are heated to 55° C. The induction period continues for 45 minutes at which time the reaction commences and goes to completion in additional time of 1½ hours. The products as mol percent conversion of the xylenol are: 21 mol percent of the xyloquinone, 39 mol percent of the corresponding diphenoquinone and 40 mol percent of the corresponding polyphenoxyether.

Having thus described my invention, I claim:

1. A process for the oxidation of 2,6-dialkylphenols which comprises:
heating a mixture which consists of
2,6-dialkylphenol, wherein the alkyl side chains have from 1–16 carbon atoms
a solvent selected from the group consisting of tertiary amyl alcohol, tertiary hexyl alcohol, and methyl isobutyl ketone, and
a catalyst, said catalyst being a mixture of cupric or ferric nitrate and a noble metal salt selected from the group consisting of palladium chlordie, palladium acetate, ruthenium chloride and rhodium chloride, while simultaneously contacting said mixture with an oxygen containing gas so as to intimately contact the oxygen and the 2,6-dialkylphenol at a temperature from about 20–80° C.

2. A process according to claim 1 wherein the alkyl side chains of said 2,6-dialkylphenol contain from 1 to 5 carbon atoms.

3. A process according to claim 1 wherein the catalyst is cupric nitrate and palladium chloride in a molar ratio from about 3 to 1 through about 16 to 1 respectively, and the amount of catalyst based upon mols of palladium chloride per mol of 2,6-dialkylphenol is from 0.03 to 0.0033.

4. A process according to claim 3 wherein the solvent is tertiary amyl alcohol.

5. A process according to claim 4 wherein the temperature is maintained at from about 30 to about 70° C.

and the alkyl side chains of said 2,6-alkyl phenol are from 1 to 5 carbon atoms.

6. A process according to claim 5 wherein the alkyl side chains of said dialkylphenol are selected from methyl, ethyl, propyl, isopropyl, tertiary amyl, tertiary butyl and isobutyl radicals.

References Cited

UNITED STATES PATENTS

| | | | |
|---|---|---|---|
| 3,555,052 | 1/1971 | Yonemitsu et al. | 260—396 N |
| 3,220,979 | 11/1965 | McNelis | 260—619 A |
| 2,644,840 | 7/1953 | Roebuck | 260—592 |
| 3,219,626 | 11/1965 | Blanchard et al. | 260—613 R |
| 3,260,701 | 7/1966 | McNelis | 260—613 R |
| 3,405,092 | 10/1968 | Meys et al. | 260—613 R |

OTHER REFERENCES

Kellcher et al., J. Appl. Polym. Sci., 11, 137 (1967).
Popova et al., Chem. Abst., 66, 2024d (1967).

VIVIAN GARNER, Primary Examiner

U.S. Cl. X.R.

260—47 R, 396 N, 473 S, 475 PN, 479 R, 520, 592, 613 R